United States Patent
Mounier et al.

(10) Patent No.: US 9,973,348 B2
(45) Date of Patent: May 15, 2018

(54) TRANSCEIVER CIRCUIT AND METHOD FOR CONTROLLER AREA NETWORKS

(71) Applicants: Philippe Mounier, Tournefeuille (FR); Phillippe Goyhenetche, Fonsorbes (FR)

(72) Inventors: Philippe Mounier, Tournefeuille (FR); Phillippe Goyhenetche, Fonsorbes (FR)

(73) Assignee: NXP USA, Inc., Austin, TX (US)

( * ) Notice: Subject to any disclaimer, the term of this patent is extended or adjusted under 35 U.S.C. 154(b) by 167 days.

(21) Appl. No.: 14/899,587

(22) PCT Filed: Jul. 24, 2013

(86) PCT No.: PCT/IB2013/001884
§ 371 (c)(1),
(2) Date: Dec. 18, 2015

(87) PCT Pub. No.: WO2015/011515
PCT Pub. Date: Jan. 29, 2015

(65) Prior Publication Data
US 2016/0234038 A1   Aug. 11, 2016

(51) Int. Cl.
*H05K 7/10* (2006.01)
*A47B 81/00* (2006.01)
(Continued)

(52) U.S. Cl.
CPC .... *H04L 12/40195* (2013.01); *G06F 13/4022* (2013.01); *G06F 13/4072* (2013.01);
(Continued)

(58) Field of Classification Search
None
See application file for complete search history.

(56) References Cited

U.S. PATENT DOCUMENTS 8,792,508 B2   7/2014 Ihle et al.
9,350,617 B2 *  5/2016 Hartwich ............. H04L 1/0002
(Continued)

FOREIGN PATENT DOCUMENTS

CN    102521188 A    6/2012
EP    2339778 A1    6/2011
(Continued)

OTHER PUBLICATIONS

Bosch; "CAN with Flexible Data-Rate"; White Paper Version 1.1; 16 pages (2011).
(Continued)

*Primary Examiner* — Hyun Nam
(74) *Attorney, Agent, or Firm* — Charlene R. Jacobsen

(57) ABSTRACT

A transceiver circuit for operating in a controller area network (CAN), having a CAN bus network and a control unit, that supports a flexible data rate (CAN FD), is described. The transceiver circuit comprises: a transmit CAN path and a receive CAN path; an input node on the transmit CAN path; a detection module operably coupled to the input node on the transmit CAN path and arranged to receive an input frame from the control unit before the input frame is transmitted on the CAN bus network and determine whether the input frame on the transmit CAN path comprises a CAN FD frame; and at least one switching module, operably coupled to the detection module and coupleable to the CAN bus network, where the at least one switching module is operable to impart a first voltage value on the CAN bus network in response to the input frame being determined as comprising a CAN FD frame.

16 Claims, 7 Drawing Sheets

(51) Int. Cl.
  *H04L 12/40* (2006.01)
  *G06F 13/40* (2006.01)
  *G06F 13/42* (2006.01)
  *H04L 29/06* (2006.01)

(52) U.S. Cl.
  CPC .... *G06F 13/4286* (2013.01); *H04L 12/40013* (2013.01); *H04L 12/4013* (2013.01); *H04L 12/40032* (2013.01); *H04L 12/40065* (2013.01); *H04L 69/22* (2013.01); *H04L 2012/40215* (2013.01)

(56) References Cited

U.S. PATENT DOCUMENTS

| | | |
|---|---|---|
| 2005/0141565 A1 | 6/2005 | Forest et al. |
| 2006/0123176 A1 | 6/2006 | Fredriksson et al. |
| 2012/0173905 A1 | 7/2012 | Diab et al. |
| 2014/0071995 A1* | 3/2014 | Hartwich .............. H04L 1/0002 370/468 |
| 2014/0258581 A1 | 9/2014 | Hartwich et al. |
| 2014/0337549 A1 | 11/2014 | Hartwich et al. |

FOREIGN PATENT DOCUMENTS

| | | |
|---|---|---|
| EP | 2521319 A1 | 11/2012 |
| JP | 2009512260 | 3/2009 |
| WO | WO-2012/150248 A | 11/2012 |
| WO | WO-2013/000911 A | 1/2013 |
| WO | WO-2013/030095 A | 3/2013 |

OTHER PUBLICATIONS

Office Action for counterpart appln No. CN 20130078425.8; 10 pages (dated Jan. 4, 2017).

International Search Report for International application No. PCT/1132013/001884 dated Apr. 22, 2014.

* cited by examiner

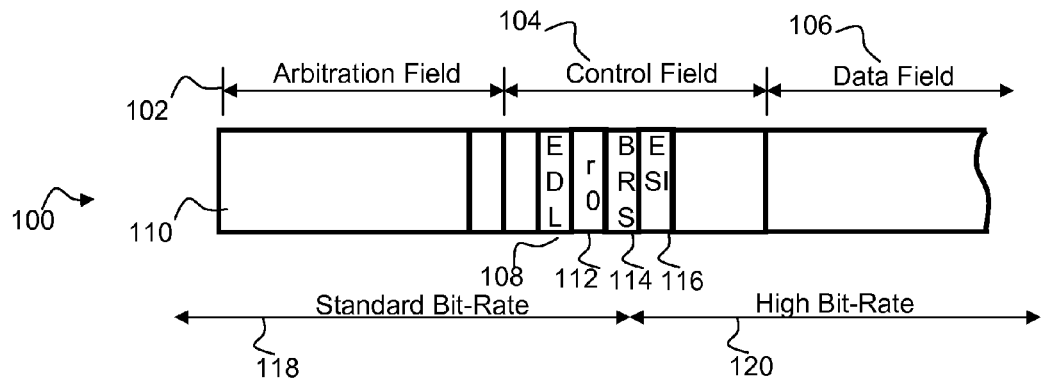
FIG. 1 - Prior art
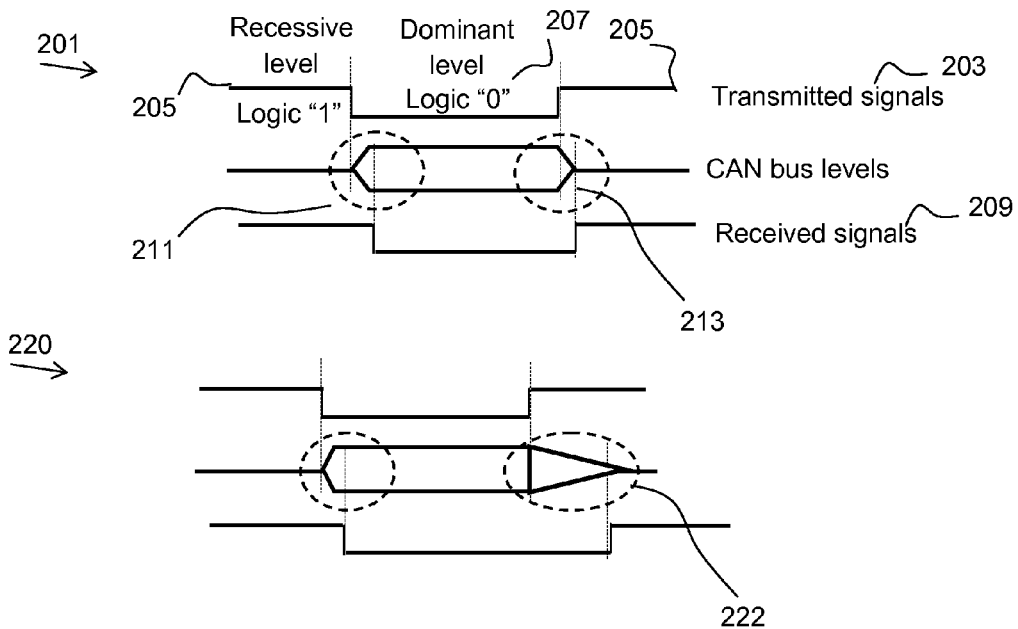
FIG. 2 - Prior art

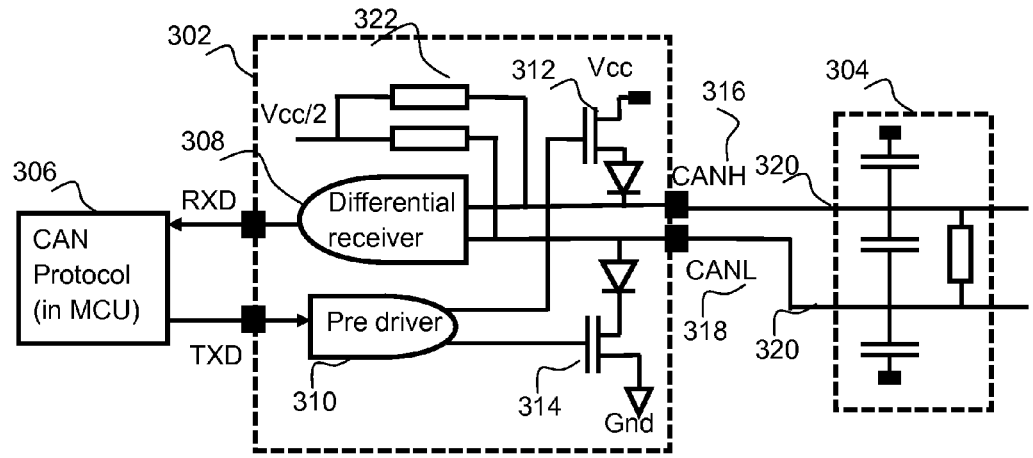
FIG. 3 - Prior art
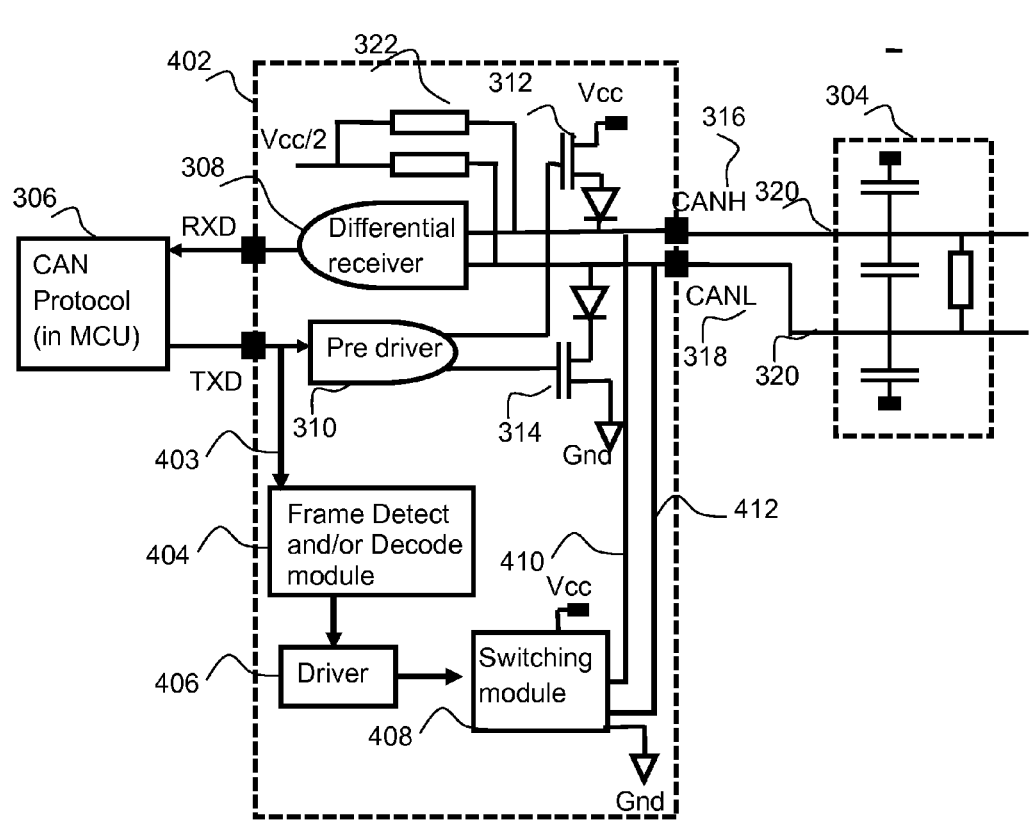
FIG. 4

TRANSCEIVER CIRCUIT AND METHOD FOR CONTROLLER AREA NETWORKS

FIELD OF THE INVENTION

This invention relates to a transceiver circuit and a method for improving Controller Area Networks (CANs), and in particular, for optimising Controller Area Networks with Flexible Data-Rate.

BACKGROUND OF THE INVENTION

The Controller Area Network (CAN) is a serial communications protocol that can efficiently support distributed real time control with a very high level of security. CAN applications can range from high speed networks to low cost multiplex wiring. Recently, it has been suggested that the ever increasing bandwidth requirements in automotive networks may impede the use of CAN due to its bit rate limitation of 1 Mbit/s. As a result, a relatively new frame format known as 'CAN with Flexible Date-Rate' (CAN FD) has been proposed. CAN FD is used to complement CAN in applications that require higher data-rates.

The general operation of CAN FD systems is documented in the art, however, for completeness, a brief summary of a specific operation will be provided here. It is known that both CAN and CAN FD systems feature an automatic arbitration-free transmission. Thus, a CAN message that is transmitted with the highest priority will succeed, and a node transmitting a lower priority message will wait for the highest priority message to be transmitted. This is achieved in a CAN system by transmitting data via a bus through a binary model of 'dominant' bits and 'recessive' bits, where dominant is logic '0' and recessive is logic T. If a recessive bit is being transmitted while a dominant bit is sent, the dominant bit will be displayed. A dominant bit is achieved by activating a switch, while a recessive bit is simply not asserted on the bus.

In the case of a dominant to recessive transition, the switch is simply disabled, thereby allowing the voltage across the bus to passively transition back to logic '1'. During arbitration, each transmitting node monitors the CAN bus state and compares a received bit with the transmitted bit. If a dominant bit is received when a recessive bit was transmitted, the node loses arbitration and stops transmitting. Arbitration is performed during the transmission of the identifier field. Each node in the CAN system starts to transmit at the same time by sending an identifier (ID) with dominant as binary '0', starting from the highest bit. As soon as a node's ID is a larger number (lower priority) they will transmit '1' (recessive) and see '0' (dominant), causing them to lose arbitration and stop transmitting. At the end of ID transmission, all nodes bar one node will have lost arbitration and have stopped transmitting, thereby leaving the node with the highest priority message to transmit.

FIG. 1 illustrates a simplified block diagram of a standard format CAN FD frame 100. The CAN FD frame 100 comprises an arbitration field 102, a control field 104 and a data field 106. The CAN FD frame 100 consists of the same elements as a CAN frame, the primary difference being that in the CAN FD frame 100, the Data Field 106 and cyclic redundancy code (CRC) field (not shown) may be longer (and transmitted at a higher speed). A further difference between normal CAN frames and CAN FD frames is at the reserved bit 108, located immediately after the end of the arbitration field 102. In CAN FD frame 100, this reserved bit 108 is transmitted as a 'recessive' level and is renamed 'Extended Data Length (EDL)'. In standard format CAN FD frame 100 with an 11-bit identifier and extended format CAN FD frames with 29-bit identifiers (not shown), the EDL bit 108 is always followed by the 'dominant' bit r0 112, which is reserved for future expansion of the protocol.

The Control Field 104 of the CAN FD frame 100 contains two additional bits, namely Bit Rate Switch (BRS) 114 and Error State Indicator (ESI) 116. BRS 114 determines whether the bit rate is switched inside the frame. If it is transmitted 'recessive', the bit rate is switched from the standard bit rate 118 to the optional high bit-rate 120. If BRS 114 is transmitted 'dominant', the bit rate is not switched. Thus, the first part of the CAN FD frame 100 (until the BRS bit 114), is transmitted with the same bit-rate as a normal CAN frame, and the bit rate is switched if the BRS bit 114 is 'recessive'. CAN FD frame 100 has the option to switch from a standard bit rate 118 to a high bit rate 120 during the transmission of the data field 106. Therefore, data intensive applications can be fully supported by the CAN FD protocol.

FIG. 2 illustrates a physical bit electrical representation (according to ISO11898 part 2 and part 5) 201 during a data field, such as data field 106 of FIG. 1, for a prior art CAN FD system under normal load. FIG. 2 further illustrates an expanded physical bit electrical representation for a prior art CAN FD system under a high bus capacitance load 220. In physical bit electrical representation 201, the transmitted signal 203 comprises a recessive level defined by a logic '1' 205 and a dominant level defined by a logic '0' 207. The received signal 209 thus incurs a transmission delay between the respective transmitted and the received recessive level, and similarly a transmission delay between the transmitted dominant level 207, and the received dominant level. These respective transmission delays are illustrated as CAN bus levels 211 and 213. The transition times on the CAN FD bus levels 211, 213 effectively limit the maximum baud rate of the CAN system. In this case, there is an active drive transition between CAN bus level 211 and a passive transition between CAN bus levels 213. This is because in current CAN systems, the dominant transition (logic '0') is actively driven, whereas the recessive transition (logic '1') is simply not asserted on the bus by de-activating any active elements that allow the bus to transition passively back to its recessive state (logic '1').

Thus, with regard to the recessive-to-dominant level transition in a CAN FD system, the expanded physical bit electrical representation 220 is essentially the same as 201. However, in the case of known CAN FD systems operating under high bus capacitance load 220, the transition time 222 from dominant-to-recessive level on the CAN bus has been increased due to the increased signal delays present in the CAN FD system. Previously, this increased transition time was not a problem due to the lower data rates being employed within the data field. However, now that CAN FD has the option of utilising an increased data rate during the data field, increased transition times from the dominant to recessive levels have the effect of limiting the maximum baud rate that can be used in the system, and thereby the data rate that can be utilised.

Referring now to FIG. 3, a known CAN FD transceiver circuit 300 is shown comprising, main transceiver circuit 302, parasitic load capacitances and load resistances 304, a CAN Protocol module (located in a main computer unit (MCU)) 306, differential receiver 308, pre-driver 310 and transceiver circuit output driver stages 312, 314. CANH 316 and CANL 318 are differential output signals on the CAN bus 320. CAN transceivers use open-drain transceiver circuit output driver stages 312, 314, where one of the output stages 312 is connected to the supply voltage, and the other open-drain output stage 314 is connected to ground. CAN protocol module 306 transmits a signal to pre-driver 310 that is operable to drive open-drain transceiver circuit output stages 312, 314. Internal resistor network 322 is generally connected to approximately half the supply voltage to create a differential output bus signal at CANH 316 and CANL 318.

If the CAN protocol module 306 determines that it needs to transmit a dominant bit on the CAN bus 320, it instructs the pre driver 310 to enable both open drain output stages 312, 314 so that they conduct, thereby producing voltage levels of typically 3.5V at CANH 316 and typically 1.5V at CANL 318. The resulting differential output voltage constitutes a dominant bit and, therefore, logic low (dominant '0'). If the CAN protocol module 306 determines that it needs to transmit a recessive bit on the CAN bus 320, it instructs the pre driver 310 to disable both open drain output stages 312, 314 so that they become high impedance and, therefore, only the Vcc/2 potential is applied via the pull-up resistors 322 to both outputs CANH 316 and CANL 318, which represents logic high (recessive '1'). The logic high phase (recessive '1') is not actively driven as in the dominant phase. Therefore, the transition time from dominant to recessive is dependent on the system passively transitioning from logic '0' to logic '1' (e.g. back to Vcc/2). The passive transition from the dominant phase to the recessive phase may increase overall transition time within the CAN bus, leading to a reduction of the maximum data rate that can be utilised during a CAN FD high bit-rate phase.

SUMMARY OF THE INVENTION

The present invention provides a transceiver circuit for operating in a controller area network, an integrated circuit and a method of operation, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified block diagram of a standard format CAN FD frame.

FIG. 2 illustrates a physical bit electrical representation during a data field for a prior art CAN or CAN FD system under normal load, and a physical bit electrical representation for a prior art CAN or CAN FD system under high bus capacitance load.

FIG. 3 illustrates a known CAN or CAN FD transceiver circuit.

FIG. 4 illustrates an example CAN FD transceiver circuit.

DETAILED DESCRIPTION

Figure 5:
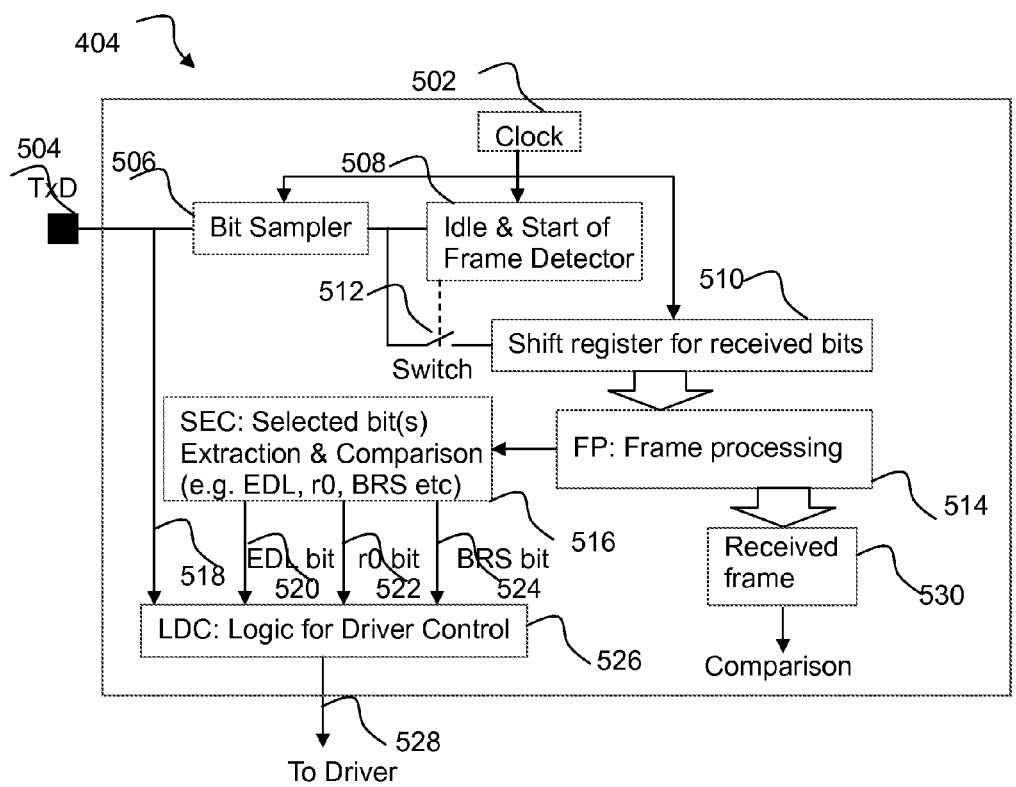
FIG. 5 illustrates an example of a CAN Frame decoder module.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Referring to FIG. 4, an example CAN FD transceiver circuit is shown. In some examples, transceiver circuit 402 may further comprise a frame detect and/or decode module 404, a driver 406 and a switching module 408, in addition to the known circuit components of FIG. 3. In some examples, the frame detect and/or decode module 404 may be configured to distinguish each individual bit of a CAN frame, and determine if this CAN frame is a classic CAN frame or a CAN FD frame. For this it uses a clock/oscillator, a bit sampling mechanism and logic decoding circuitry, as further described with reference to FIG. 5.

In some examples, the frame detect and/or decode module 404 is solely operably coupled to the transmitted input signal from the CAN protocol module 306. In this manner, the frame detect and/or decode module 404 is able to determine whether a CAN frame or a CAN FD frame is about to be transmitted on the CAN bus, before it is actually transmitted (or at least in some examples before a portion of the control field and the data field of the CAN FD frame is transmitted).

In some examples, the frame detect and/or decode module 404 may be operable to determine whether the coupled transmitted input signal 403 has a recessive reserved bit or a dominant reserved bit. In some examples, the frame detect and/or decode module 404 may further determine that the reserved bit, in some examples the Extended Data Length (EDL) bit 108 of FIG. 1, may be transmitted in the recessive state. In this manner, in some examples, the frame detect and/or decode module 404 may determine that the coupled transmitted input signal 403 may be a CAN FD frame.

In one example, a detected logic '1' of the EDL bit 108 may signify a CAN FD frame, whereas a detected logic '0' of the EDL bit 108 may signify a normal CAN frame.

In some examples, if the frame detect and/or decode module 404 determines that the coupled transmitted input signal 403 is a CAN frame, the detection module may not enable driver module 406. In some examples, if the frame detect and/or decode module 404 determines that the coupled transmitted input signal 403 is a CAN FD frame, the detection module may enable driver module 406.

In some examples, driver module 406 may be actively enabled during a (what would ordinarily have been a passive) dominant to recessive transition that transitions the CAN bus to a logic '1'. In other examples, driver module 406 may be disabled during an (active) recessive to dominant transition that transitions the CAN bus to a logic '0'. In some examples, driver module 406 may be enabled for all dominant to recessive transitions. In other examples, driver module 406 may be enabled for a select number of dominant to recessive transitions. In some examples, enablement in either all dominant to recessive transitions or selective dominant to recessive transitions may be performed during an arbitration field or a control field.

In some examples, driver module 406 may be enabled whilst the detector module is receiving a CAN FD frame data field. In other examples, driver module 406 may be enabled during transmission of a high bit-rate field of a CAN FD frame. For example, the driver module 406 may be disabled/enabled in response to detection of, and/or during transmission of, an arbitration field of a CAN frame or a CAN FD frame. In other examples, the driver module 406 may be disabled/enabled in response to detection of, and/or during transmission of, a control field of a CAN frame or a CAN FD frame. In a further example, the driver module 406 may be enabled at a specific point in a control field, for example after the BRS bit 114 of FIG. 1.

In some examples, the driver module 406 may be operable to operate on both standard CAN frames and CAN FD frames, as well as extended format CAN frames and CAN FD frames. In some examples, driver module 406 may be configured to only operate during a CAN FD frame operation.

In some examples, the driver module 406 may be deactivated by the frame detect and/or decode module 404 after transmission of a high bit-rate data field of a CAN FD frame.

In some examples, the driver module 406 may be deactivated after the frame detect and/or decode module 404 detects a cyclic redundancy check (CRC) delimiter within a CRC field within a CAN frame or CAN FD frame, because the detection module has determined that a CAN FD frame transmission has been completed.

In some examples, driver module 406 may be enabled during a complete dominant to recessive state. In other examples, driver module 406 may be enabled temporarily at a transition from a dominant to a recessive state. Thus, driver module 406 may be enabled during a transition from the dominant to recessive state, and disabled once the transition has been completed.

In some examples, driver 406 may be operable to control switching module 408. In some examples, disabling driver module 406 may also disable switching module 408. In some examples, switching module may be a simple single pole double throw switch, or similar. In some examples, switching module 408 may be an electro-mechanical switch, for example a relay. In other examples, switching module 408 may be a differential element, for example, a differential switch. In other examples, switching module 408 may be a semiconductor type device. In some examples, switching module 408 may comprise a plurality of transistor type devices. In some examples, switching module 408 may comprise a MOSFET operably coupled to both CANH 316 and CANL 318. In some examples, the coupling of the MOSFET to the CAN bus may be dependent upon the type (e.g. enhancement or depletion type device) of MOSFET utilised. In other examples, switching module 408 may be a field effect transistor (FET), bipolar junction transistor (BJT) or any other suitable semiconductor switching device. In other examples, switching module 408 may comprise logic gates. In yet further examples, switching module 408 may comprise an element with a dual structure between CANL 318 and an upper biasing level or Vcc and CANH 316 and a lower biasing level or gnd.

In some examples, the transition time may be much shorter than in known CAN systems when enabling the switching module 408, and thereby actively switching a transition between dominant and recessive states.

In some examples, detecting the coupled transmitted input signal 403 before the transmitted input signal 403 is effectively transmitted on the CAN bus network may allow the detection module to determine whether the coupled transmitted input signal 403 is a CAN FD frame earlier than in current CAN systems. In current CAN systems, a CAN FD frame would only be identified once the transmitted input signal from the CAN protocol module 306 had been 'received' on the receive path of the CAN bus. In some examples, detecting a CAN FD frame before it is transmitted on the CAN bus may thus allow the frame detect and/or decode module 404 to improve the maximum baud rate of the system. In some examples, selectively enabling switching module 408 may further improve the maximum baud rate of the system, as the system may be actively used for a longer period of time due to the active transition from the dominant phase to the recessive phase.

In some examples, enabling switching module 408 during a CAN FD frame, detected by frame detect and/or decode module 404, may enable the switching module 408 to improve/shorten a dominant to recessive transition. Thus, in some examples, enabling switching module 408 may pull the differential CAN bus output voltage back to its recessive state (zero bus differential voltage) faster than in current CAN systems.

Referring now to FIG. 5, a simplified exemplary block diagram of a frame detect and/or decode module 404 is illustrated. In one example, frame detect and/or decode module 404 comprises a bit sampler module 506 operably coupled to a transmitter port 504. The sampling operation of bit sampler module 506 is controlled by clock 502. Thus, a transmitted input signal (CAN frame) appearing on the transmitter (TxD) port 504 is sampled at a clock rate by bit sampler module 506. The output from the bit sampler module 506 is input to a shift register module 510. An idle phase and start of frame detector module 508 is also operably coupled to the clock 502 and bit sampler module 506 and controls detecting whether the transmitted signal is recessive for an entire duration of the CAN idle phase, as described, for example, in the ISO11898-1.

Once the idle phase and start of frame detector module 508 is detected the idle phase and start of frame detector module 508 closes the switch 512, thereby enabling the transmitted input signal (CAN frame) to be loaded into shift register module 510. In one example, only part of the frame may be transferred, in order to determine whether the frame is a regular CAN frame or a CAN FD frame. In this manner, only the relevant part of the frame may be processed by the frame processing unit 514, which in one example for instance processes and manages a bit stuffing operation according to ISO 11898-1. Once the frame processing unit 514 has completed the bit stuffing operation, then appropriate and relevant bits such as: the EDL bit 520, the r0 bit 522 and BRS bit 524, etc. may be extracted and process by the selected bit extraction & comparison (SEC) unit 516. The SEC unit 516 then transfers 528 the extracted signal to the Logic for Driver Control (LDC) 526, which also passes the transmitted input signal (CAN frame) from the transmitter port 504.

In addition, in one example, the frame processing unit 514 may pass the received frame 530 to a comparison function, for example as part of a selective wake-up unit (SWU)/receiver CAN FD function, as described with reference to FIG. 7.

Figure 6:
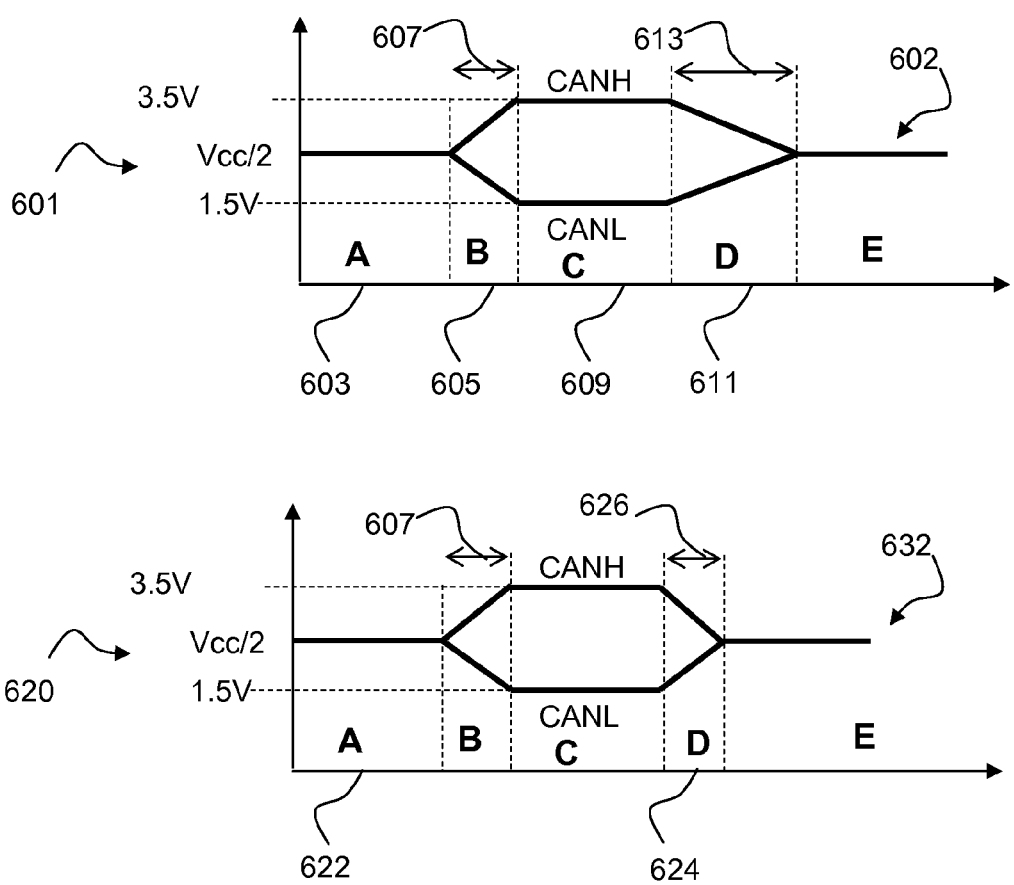
FIG. 6 illustrates example CAN FD bus signals.

Referring now to FIG. 6, simplified timing diagrams of high load CAN FD bus signals 601, 620 for a known CAN FD system and for an example CAN FD system incorporating aspects of the invention are illustrated. In the timing diagram 601 of a current CAN FD system, the CAN bus 602 may initially be in a recessive state 'A' 603, for example caused by conducting transistors 312, 314 of FIG. 3 being disabled (high impedance). In this case, the CAN bus is at a voltage level of half the supply voltage, as applied by resistor network 322 to both outputs CANH 316 and CANL 318 in FIG. 3, which represents logic high or a recessive bit.

At time instant 'B' 605, the CAN protocol module (CAN protocol module 305 of FIG. 3) determines that a dominant bit should be transmitted. Therefore, in this case, conducting transistors 312, 314 are enabled thereby causing a change in voltage in the CAN bus 602. In this case, with reference to FIG. 3, CANH 316 transitions to 3.5V and CANL 318 transitions to 1.5V. As the transition is actively forced by the conducting transistors 312, 314, transition time 607 is relatively small.

At time instant 'C' 609, the differential output voltage at the CAN bus 602 results in a dominant bit, namely a logic low within the CAN system.

At time instant 'D' 611, the CAN protocol 306 transmits a disabling signal (logic '1') to the conducting transistors 312, 314 in FIG. 3, thereby causing them to become high impedance. Therefore, only the Vcc/2 potential is applied via resistor network 322 to both outputs CANH 316 and CANL 318. As the transition from dominant to recessive is a passive transition, the transition time 613 is substantially longer than for the active transition case 607. In some instances, the relatively lengthy transition time from dominant to recessive in a passive manner may be due to time constants within the system, for example from parasitic capacitances, and resistances within the CAN bus 602. In this manner, the relatively lengthy transition time 611 in a current CAN FD system will limit the maximum baud rate that the CAN FD system can employ during a high bit-rate phase.

Referring now to the timing diagram example 620 of an example CAN FD system incorporating aspects of the invention, the transition time from the dominant to recessive bit is significantly reduced. In some examples, with reference to FIG. 4, frame detect and/or decode module 404 detects, via the coupled transmitted input signal 403, that a CAN FD frame is being transmitted by CAN protocol module 306 before the transmitted input signal is transmitted on the CAN bus network. Therefore, in some examples, frame detect and/or decode module 404 may become aware of a CAN FD frame before it is transmitted on the CAN bus 632 at time instant 'A' 622. Furthermore, when the transmission of the CAN FD frame is complete, the frame detect and/or decode module 404 is aware that, at time instant 'D' 624, it needs to actively drive the transition on the CAN bus 632 from dominant to recessive.

In some examples, actively driving the transition from dominant to recessive reduces the transition time 626. In some examples and with reference to FIG. 4, if switching module 408 is activated, for example in response to a CAN FD dominant to recessive transition, the switching module 408 may be operable to couple CANH 316 and CANL 318 bus voltages together.

In some examples, switching module 408 may be implemented during a transmit/receive mode within a CAN FD frame, e.g. where a signal is transmitted from a transmit unit to the bus or the bus to a receive unit. In other examples, switching module 408 may be implemented during a dominant to recessive transition within a CAN FD high bit-rate within a data region. In yet further examples, switching module 408 may be utilised within the transmit/receive mode and dominant to recessive transition within a CAN FD frame.

Figure 7:
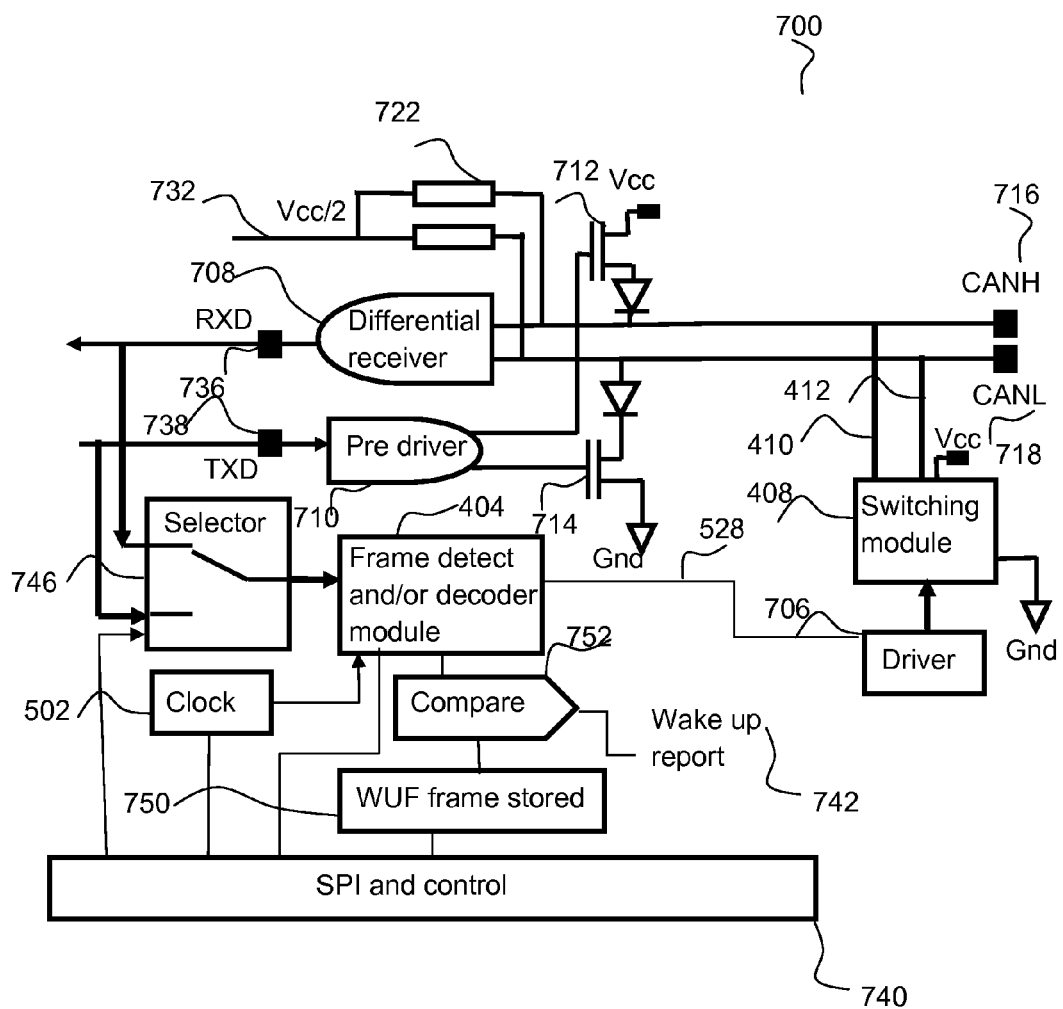
FIG. 7 illustrates an example selective wake-up unit (SWU) CAN FD transceiver.

Referring now to FIG. 7, an example application of the invention is illustrated, whereby a portion of circuitry of a CAN transceiver can be adapted to employ a selective wake up (SWU) function. In one example, the operation of the frame detect and/or decode module 404 is as described with reference to FIG. 5.

In one example, the concepts herein described support three operating modes. A first mode of operation may comprise the Tx/Rx (transmit-receive), whereby a selector 746 is arranged to detect whether (or not) a Tx frame is a CAN FD frame. In a device operating mode of TxRx, the selector 746 passes the TxD signal on port 738 to the frame detect/decoder module 404.

A second mode of operation may comprise disabling the Tx/Rx mode and entering a sleeping mode. A first sub-mode of operation may enable the CAN transceiver to exit the sleep mode in response to a receipt of any CAN message. However, as discussed below with respect to FIG. 7, a second sub-mode of operation, may enable the CAN transceiver to exit the sleep mode in response to a receipt of a specific or dedicated CAN message. Here, selector 746 may be configured to look for a dedicated CAN message e.g., a pre-stored CAN wake up frame message, which the frame detect/decoder module 404 compares with the received frame. Only in response to determining a match between the received frame and the pre-stored CAN wake up frame message does the frame detect/decoder module 404 initiate wake-up.

For example, a frame processing unit located within frame detect and/or decode module 404, say frame processing unit 514 of FIG. 5, may pass a received frame to a comparison function 752, which compares the received frame with a wake-up frame 750. The selection of the identified wake-up frame 750 is controlled by serial-to-parallel interface (SPI) and control module 740. If the received frame matches wake-up frame 750, as determined by the compare function 752, a wake up report event 742 is initiated, if the device operating mode is in frame detect mode.

In one example, the circuitry used to decode the CAN frame in an SWU implementation may also be used to decode the beginning of a frame coming from transmitted input (TXD) 738, and extract the appropriate relevant bits (e.g. EDL bit 520, r0 522, BRS 524, etc.).

In these examples, the selector 746 may be controlled by a serial-to-parallel interface (SPI) and control module 740, with the switch configuration being dependent upon the device operating mode. In a device operating mode of frame detect, the selector 746 passes the RxD signal on port 736 to the frame detect/decoder module 404.

Figure 8:
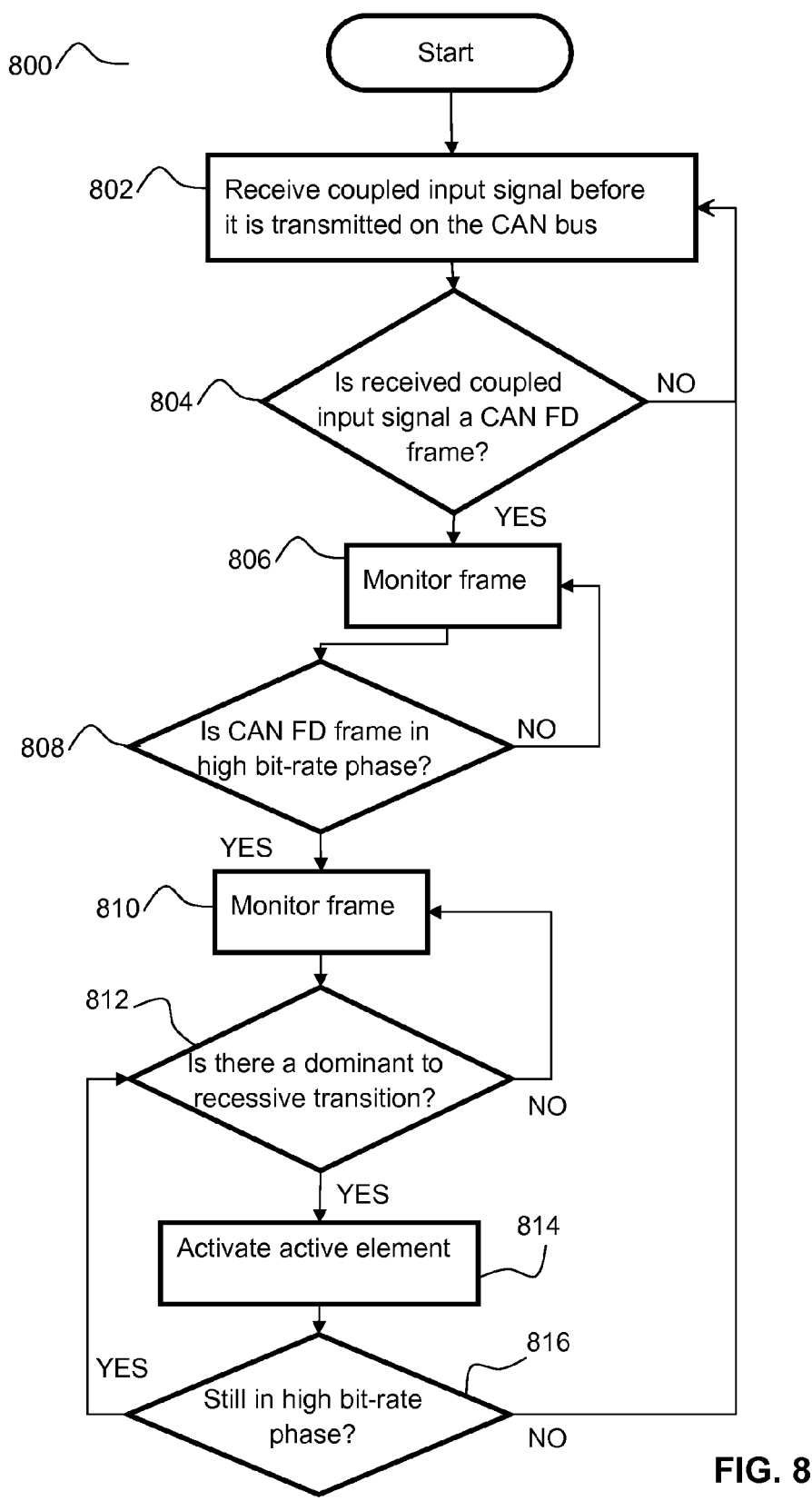
FIG. 8 illustrates an example flow chart for a CAN FD transceiver circuit.

Referring now to FIG. 8, an example flow chart 800 illustrates a CAN FD transceiver circuit adapted in accordance with some example embodiments of the invention. Initially, at 802, the CAN FD transceiver circuit may receive a coupled input signal from a control unit, for example a main computer unit (MCU). In some examples, the received coupled input signal may reach detection circuitry of the CAN FD transceiver circuit before it is transmitted on the CAN bus.

At 804, a determination is made as to whether the received coupled input signal is a CAN FD frame. In some examples, at 804, a determination may be made as to whether the coupled transmitted input signal has a recessive reserved bit or a dominant reserved bit. In some examples, it may be determined that the reserved bit, in some examples an EDL bit, is transmitted in a recessive state. Therefore, in some examples, the CAN FD transceiver circuit may determine that the coupled transmitted input signal may be a CAN FD frame.

If it is determined at 804 that the received coupled input signal is not a CAN FD frame, the flowchart returns to 802.

If the circuit determines at 804 that the received coupled input signal is a CAN FD frame, the CAN FD transceiver circuit may monitor the CAN FD frame at 806. At 808, a determination is made as to whether the CAN FD frame is in a high bit-rate phase. If it is determined in 808 that the CAN FD frame is not in a high bit-rate phrase, the flowchart loops to 806 and continues to monitor the CAN FD frame.

If it is determined in 808 that the CAN FD frame is in a high bit-rate phase, a secondary monitoring phase is commenced at 810. At 812, a determination may be made as to whether there is a dominant to recessive transition within the high bit-rate phase of the CAN FD frame. If a determination is made that there is a dominant to recessive transition in 812, an active element is activated in 814 to actively force a transition at an appropriate time instant.

If it is determined in 812 that there is not a dominant to recessive transition, the flowchart loops to 810 and the CAN FD frame continues to be monitored.

In some examples, the active element may be activated for the entire duration of the recessive bit. In other examples, the active element may be activated for part of the duration of the recessive bit. In yet further examples, the active element may be activated temporarily at the dominant to recessive transition.

At 816, a determination is made as to whether the CAN FD frame is still in a high bit-rate phase. If it is determined that the CAN FD frame is still in the high bit-rate phase, the flowchart loops to 812 in order to determine whether there is another dominant to recessive transition. Otherwise, the flowchart loops to 802 if it is determined that the CAN FD frame is no longer in a high bit-rate phase. In some examples, a high bit-rate phase may end due to a CRC delimiter, for example, or an error within the CAN FD frame.

Figure 9:
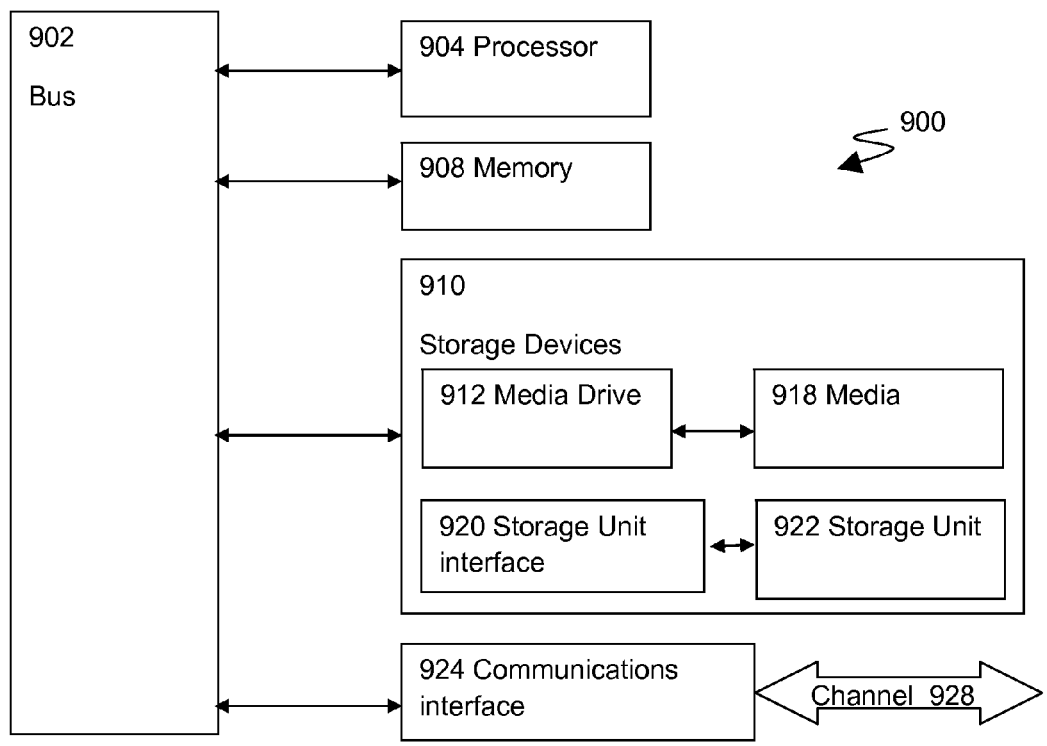
FIG. 9 illustrates an example computing system that may be employed to implement software-controlled CAN FD functionality.

Referring now to FIG. 9, there is illustrated a typical computing system 900 that may be employed to implement software-controlled CAN FD frame detection and processing, particularly with regard to effecting an active dominant to recessive transition. Those skilled in the relevant art will also recognize how to implement the invention using other computer systems or architectures. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

In some examples, computing system 900 may be operable to control at least one CAN FD transceiver circuit utilising aspects of the invention. In some examples, computer system 900 may be operable to activate a switching module during a dominant to recessive transition within a CAN FD frame. In yet further examples, computer system 900 may be operable to activate a switching module during a dominant to recessive transition during a high bit-rate phase during a CAN FD frame. In some examples, computer system 900 may be operable to control a plurality of transceiver circuits and switching modules.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, a CAN bus, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 922, drive 912 or communications interface 924. The control logic (in this example, software instructions or computer program code), when executed by the processor 904, causes the processor 904 to perform the functions of the invention as described herein.

Thus, examples of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Thus, the computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A transceiver circuit for operating in a controller area network, CAN, having a CAN bus network and a control unit, that supports a flexible data rate, CAN FD, wherein the transceiver circuit comprises:
   a transmit CAN path and a receive CAN path;
   an input node on the transmit CAN path;
   a detection module operably coupled to the input node on the transmit CAN path and arranged to receive an input frame from the control unit before the input frame is transmitted on the CAN bus network and determine whether the input frame on the transmit CAN path comprises a CAN FD frame; and
   at least one switching module, operably coupled to the detection module and coupleable to the CAN bus network, where the at least one switching module is operable to impart a first voltage value on the CAN bus network in response to the input frame being determined as comprising a CAN FD frame, wherein the first voltage value is a predetermined reference value defined by the at least one switching module shorting differential output signals on a CAN bus.

2. The transceiver circuit of claim 1, wherein the at least one switching module is activated during a high bit-rate region of a CAN FD frame.

3. The transceiver circuit of claim 2, wherein the at least one switching module is activated during a dominant to recessive transition within the high bit-rate region.

4. The transceiver circuit of claim 2, wherein the at least one switching module is activated solely during a high bit-rate region of a CAN FD frame.

5. The transceiver circuit of claim 1 wherein the at least one switching module comprises at least one differential switch.

6. An integrated circuit comprising the transceiver circuit of claim 1.

7. A transceiver circuit for operating in a controller area network, CAN, having a CAN bus network and a control unit, that supports a flexible data rate, CAN FD, wherein the transceiver circuit comprises:
   a transmit CAN path and a receive CAN path;
   an input node on the transmit CAN path;
   a detection module operably coupled to the input node on the transmit CAN path and arranged to receive an input frame from the control unit before the input frame is transmitted on the CAN bus network and determine whether the input frame on the transmit CAN path comprises a CAN FD frame; and
   at least one switching module, operably coupled to the detection module and coupleable to the CAN bus network, where the at least one switching module is operable to impart a first voltage value on the CAN bus network in response to the input frame being determined as comprising a CAN FD frame, wherein the at least one switching module is operably coupled to the detection module via at least one driver arranged to drive a CAN bus either from a first CAN line to ground or from a second CAN line to a supply voltage.

8. The transceiver circuit of claim 7, further comprising a wake up receiver operably coupled to the CAN bus and arranged to provide selective wake up functionality in response to a signal from the at least one driver.

9. The transceiver circuit of claim 8 further comprising a comparison function operably coupled to the detection module and arranged to initiate wake-up in response to comparing a received frame provided by the detection module with a dedicated CAN message.

10. A transceiver circuit for operating in a controller area network, CAN, having a CAN bus network and a control unit, that supports a flexible data rate, CAN FD, wherein the transceiver circuit comprises:
    a transmit CAN path and a receive CAN path;
    an input node on the transmit CAN path;
    a detection module operably coupled to the input node on the transmit CAN path and arranged to receive an input frame from the control unit before the input frame is transmitted on the CAN bus network and determine whether the input frame on the transmit CAN path comprises a CAN FD frame; and
    at least one switching module, operably coupled to the detection module and coupleable to the CAN bus network, where the at least one switching module is operable to impart a first voltage value on the CAN bus network in response to the input frame being determined as comprising a CAN FD frame, wherein the detection module is arranged to determine whether the input frame comprises a recessive reserved bit or a dominant reserved bit.

11. The transceiver circuit of claim 10 wherein the reserved bit is an Extended Data Length (EDL) bit.

12. A transceiver circuit for operating in a controller area network, CAN, having a CAN bus network and a control unit, that supports a flexible data rate, CAN FD, wherein the transceiver circuit comprises:
    a transmit CAN path and a receive CAN path;
    an input node on the transmit CAN path;
    a detection module operably coupled to the input node on the transmit CAN path and arranged to receive an input frame from the control unit before the input frame is transmitted on the CAN bus network and determine whether the input frame on the transmit CAN path comprises a CAN FD frame; and at least one switching module, operably coupled to the detection module and coupleable to the CAN bus network, where the at least one switching module is operable to impart a first voltage value on the CAN bus network in response to the input frame being determined as comprising a CAN FD frame, wherein the at least one switching module is operable to impart the first voltage value on the CAN bus network during a dominant to recessive transition and operable to disable the first voltage value on the CAN bus network during a recessive to dominant transition.

13. A transceiver circuit for operating in a controller area network, CAN, having a CAN bus network and a control unit, that supports a flexible data rate, CAN FD, wherein the transceiver circuit comprises:
a transmit CAN path and a receive CAN path;
an input node on the transmit CAN path;
a detection module operably coupled to the input node on the transmit CAN path and arranged to receive an input frame from the control unit before the input frame is transmitted on the CAN bus network and determine whether the input frame on the transmit CAN path comprises a CAN FD frame; and
at least one switching module, operably coupled to the detection module and coupleable to the CAN bus network, where the at least one switching module is operable to impart a first voltage value on the CAN bus network in response to the input frame being determined as comprising a CAN FD frame, wherein the at least one switching module is operable to impart the first voltage value on the CAN bus network during a dominant to recessive transition and operable to disable the first voltage value on the CAN bus network once the dominant to recessive transition has been completed.

14. A transceiver circuit for operating in a controller area network, CAN, having a CAN bus network and a control unit, that supports a flexible data rate, CAN FD, wherein the transceiver circuit comprises:
a transmit CAN path and a receive CAN path;
an input node on the transmit CAN path;
a detection module operably coupled to the input node on the transmit CAN path and arranged to receive an input frame from the control unit before the input frame is transmitted on the CAN bus network and determine whether the input frame on the transmit CAN path comprises a CAN FD frame; and
at least one switching module, operably coupled to the detection module and coupleable to the CAN bus network, where the at least one switching module is operable to impart a first voltage value on the CAN bus network in response to the input frame being determined as comprising a CAN FD frame, wherein the transceiver circuit further comprises a driver module operably coupled to the detection module and switching module and the detection module enables the driver module to impart the first voltage value on the CAN bus network by applying a control signal to the switching module in response to the input frame being determined as comprising a CAN FD frame.

15. A method for communicating in a controller area network, CAN, having a CAN bus network and a control unit that supports a flexible data rate, CAN FD, the method comprising:
receiving an input frame from the control unit on an input node on a transmit CAN path before the input frame is transmitted on the CAN bus network;
determining whether the input frame comprises a CAN FD frame; and
activating at least one switching module thereby imparting a first voltage value on the CAN bus network in response to the input frame being determined as comprising a CAN FD frame, wherein the first voltage value is a predetermined reference value defined by the at least one switching module shorting differential output signals on a CAN bus.

16. The method of claim 15, further comprising using executable program code to communicate in a controller area network, the executable program code operable for, when executed at a transceiver circuit, performing the steps of receiving and determining.

* * * * *